United States Patent [19]

Hojo et al.

[11] Patent Number: 4,791,727
[45] Date of Patent: Dec. 20, 1988

[54] GYRO APPARATUS

[75] Inventors: Takeshi Hojo; Takafumi Nakaishi; Mikio Morohoshi, all of Kuroiso, Japan

[73] Assignee: Kabushikikaisha Tokyo Keiki, Tokyo, Japan

[21] Appl. No.: 110,427

[22] Filed: Oct. 20, 1987

Related U.S. Application Data

[63] Continuation-in-part of Ser. No. 871,922, Jun. 9, 1986, abandoned.

[30] Foreign Application Priority Data

Jun. 10, 1985 [JP] Japan ................................ 60-125868

[51] Int. Cl.⁴ ............................................. G01C 19/38
[52] U.S. Cl. .................................................. 33/325
[58] Field of Search ......... 33/363 R, 363 K, 324–327, 33/318, 1 N, 1 L, 1 T, 1 PT; 74/5.6 R, 5.6 A, 5.6 D, 5.6 E; 250/231 GY, 231 SE

[56] References Cited

U.S. PATENT DOCUMENTS

| 3,806,913 | 4/1974 | Kerhoas et al. | 250/231 GY |
| 3,927,474 | 12/1975 | Lapeyre | 33/363 K X |
| 4,263,506 | 4/1981 | Epstein | 250/231 SE |
| 4,451,990 | 6/1984 | Hojo | 33/327 |

Primary Examiner—Harry N. Haroian

[57] ABSTRACT

In a gyro apparatus comprising a binnacle, a gyro the spin axis of which is made substantially horizontal, a supporting apparatus for supporting the gyro from the binnacle with a freedom of three axes, a north-seeking apparatus for giving a north-seeking action to the gyro, a follow-up ring following up the gyro around its vertical axis, a servo motor for rotating the follow-up ring by a deviation singal around the vertical axis of teh gyro relative to the follow-up ring and a transmiting apparatus for transmitting an azimuth angle of the spin axis relative to the binnacle to the outside, the gyro apparatus is characterized in that the transmitting apparatus is formed of a digital encoder having a reference angular position transmitting device and a first counter apparatus being made operable by an output signal of the encoder.

3 Claims, 9 Drawing Sheets

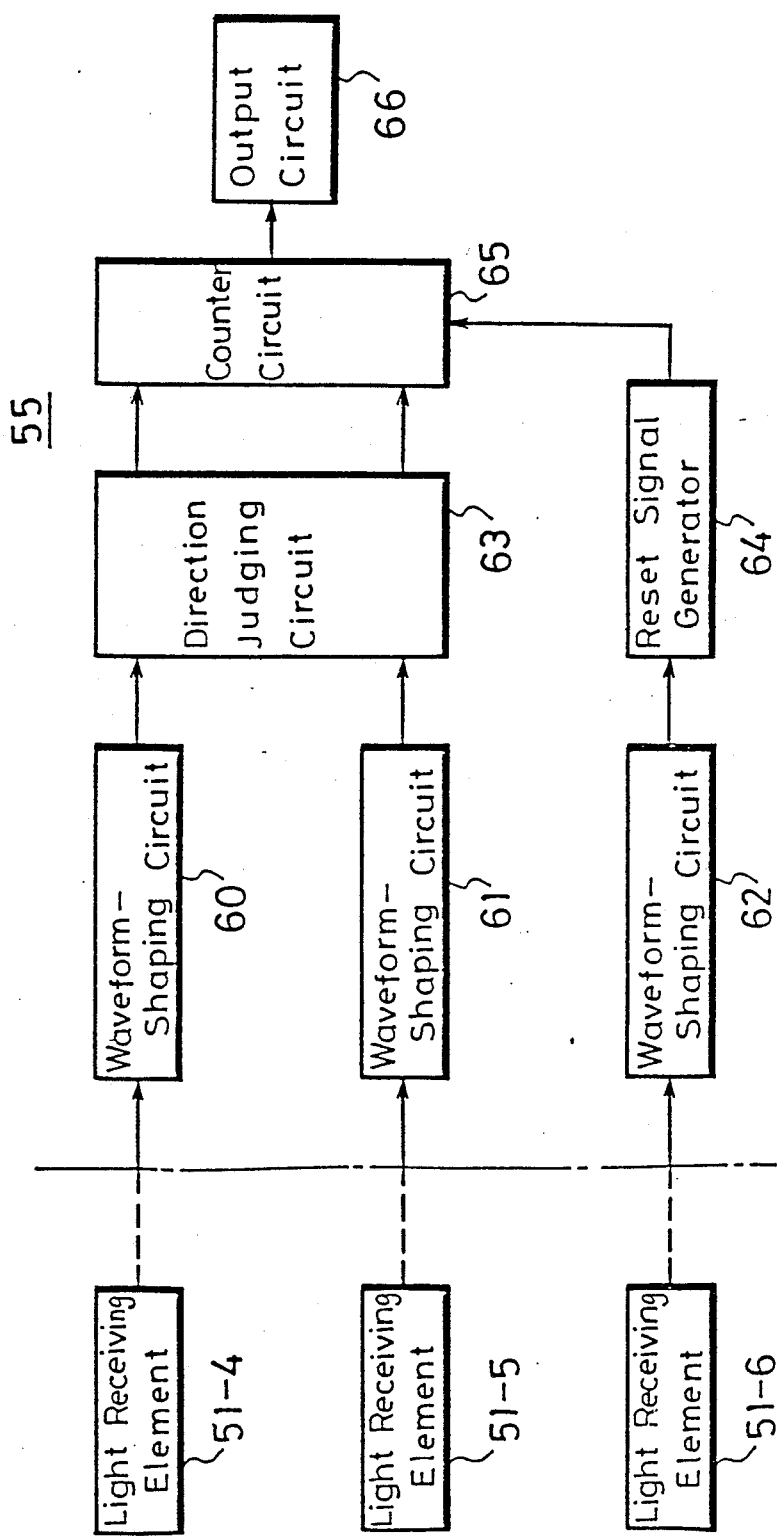
F I G. 10

GYRO APPARATUS

CROSS-REFERENCE TO RELATED APPLICATION

This application is a continuation-in-part of Ser. No. 871,922, filed June 9, 1986 entitled "GYRO APPARATUS" in which the inventors are Takeshi Hojo, Takafumi Nakaishi and Mikio Morohoshi, now abandoned.

BACKGROUND OF THE INVENTION

1. Field of the Invention

The present invention relates generally to gyro apparatus and, more particularly, is directed to a gyro apparatus of a small size which can be mounted on a ship and also on a land navigation vehicle.

2. Description of the Prior Art

An outline of a prior art gyro apparatus previously proposed by the present applicant of the invention (see, for example, U.S. Pat. No. 3,855,711) will be described briefly with reference to FIGS. 1 to 5.

In FIG. 1, reference numeral 1 designates a gyro casing or housing which incorporates therein a gyro rotor rotating at a high speed and which is formed as a liquid-tight structure. Reference numeral 2 designates a container or receptacle container like a tank which surrounds the gyro casing 1. Reference numeral 3 designates a suspension wire which supports the gyro casing 1. The upper end of the suspension wire 3 is fixed to the container 2 and the lower end thereof is fixed to the gyro casing 1. Reference numerals 4N, 4S and 5N, 5S respectively designate primary sides and secondary sides of a non-contact type displacement detecting apparatus 6. The primary sides 4N and 4S are respectively attached on the surface of, for example, the gyro casing 1 at intersections where the extended line of the spin axis of the gyro intersects the surface of the gyro casing 1, that is, the north side and the south side of the gyro. While, the secondary sides 5N and 5S are respectively attached to the container 2 at its positions corresponding to the primary sides 4N and 4S. Reference numeral 7 designates a liquid such as a damping oil or the like having a high viscosity and this liquid 7 fills the container 2. At the positions (east and west) on the equator of the container 2 and perpendicular to the spin axis, there are attached one ends of a pair of horizontal axes 8 and 8', while the other ends thereof are rotatably engaged with bearings 13 and 13' which are provided at the corresponding positions of a horizontal ring 12. Reference numeral 10 designates a horizontal follow-up servo motor which is attached to the horizontal ring 12. A horizontal gear 9 is attached to one horizontal shaft 8 and this horizontal gear 9 is engaged with a horizontal pinion 11 which is mounted to the rotary shaft of the servo motor 10. Gimbal shafts 14 and 14' are respectively attached to the horizontal ring 12 at its positions perpendicular to the afore-mentioned horizontal shaft bearings 13 and 13'. These gimbal shafts 14 and 14' are rotatably engaged with gimbal shaft bearings 15 and 15' which are attached to a follow-up ring 16 at corresponding positions, respectively. To the upper end and the lower end of the follow-up ring 16, there are attached follow-up shafts 17 and 17' the free ends of which are rotatably engaged with follow-up shaft bearings 25 and 25' mounted on a binnacle 24 at its corresponding positions. An azimuth gear 21 is attached to one follow-up shaft 17. Reference numeral 19 designates an azimuth follow-up servo motor mounted on the binnacle 24 and reference numeral 20 designates an azimuth pinion attached to the rotary shaft of the azimuth follow-up servo motor 19. This azimuth pinion 20 is engaged with an azimuth gear 21. Reference numeral 22 designates a compass card which is attached to the follow-up shaft 17'. Reference numeral 23 designates a base line plate attached on the upper surface of the binnacle 24 so as to oppose the compass card 22. By a base or lubber line 26 drawn on the central portion of the base line plate 23 and the compass card 22, it is possible to read the course of the navigation vehicle which is equipped with this gyro apparatus.

Subsequently, one practical example of the above mentioned non-contact type displacement detecting apparatus 6 used in this prior art gyro apparatus will be described with reference to FIGS. 2 and 3. FIG. 2 shows one set at the N (north) side thereof. As shown in FIG. 2, the primary side (4N) is made as one primary winding, in which the winding wire is located within the plane perpendicular to the spin axis of the gyro rotor and is generally excited by an alternating current which is used commonly by a gyro current source to thereby form alternating magnetic fields shown by broken line arrows al and al'. Similarly, the secondary side (5N) is formed of 4 rectangular windings 5NW, 5NE, 5NU and 5NL, in which the pair of windings 5NW and 5NE are located in parallel to each other in the lateral direction, while another pair of the windings 5NU and 5NL are located in the up and down direction. The winding starting ends of the pair of the windings 5NW and 5NE and the winding starting end of the pair of the windings 5NU and 5NL are connected to one another. Let it now be considered that the primary winding 4N, that is, the gyro casing 1 be positioned at the center of the secondary windings, that is, the container 2. Then, since the magnetic flux generated by the primary winding 4N penetrates each of 4 secondary windings 5NW, 5NE, 5NU and 5NL, voltages are induced at the respective 4 windings 5NW, 5NE, 5NU and 5NL in response to the flux. However, since the changes of the magnetic flux with respect to time in each of the four secondary windings 5NW, 5NE, 5NU and 5NL are substantially the same and also the respective pairs of the windings are connected in a differential fashion as described above, no voltage is generated at their output terminals 2-1 and 2-2 at all. When the primary winding 4N, is deviated to, for example, the east shown by E in FIG. 2), the magnetic flux penetrating the secondary winding 5NE is increased while the magnetic flux penetrating the secondary winding 5NW is decreased. As a result, the voltage is generated at the output terminal 2-1, while no voltage is generated at the output terminal 2-2.

On the other hand, when the primary winding 4N is deviated to the west (shown by W in FIG. 2), contrary to the above, the induced voltage of the secondary winding 5NW is increased and the induced voltage of the secondary winding 5NE is decreased so that a voltage having a phase opposite to that of the case where the primary winding 4N is deviated in the east is generated at the terminal 2-1. In this case, since the secondary windings 5NU and 5NL are located in the up and down directions, no output voltage is generated at the output terminal 2-2 similarly as described above. Whereas, when the primary winding 4N is displaced in the up and down directions, no output voltage is generated at the secondary windings 5NW and 5NE which are located in the lateral direction, while voltage is generated at the secondary windings 5NL and 5NU located in the vertical direction so that the output voltage is generated at the terminal 2-2. In other words, according to the gyro apparatus having the structure shown in FIG. 1, it is possible to detect the displacement of the gyro casing 1 at the N end in the east-and-west directions and the up-and-down directions relative to the container 2.

FIG. 3 shows only the detecting apparatus which detects the displacement in the east-and-west directions and FIG. 3 is a location diagram showing the gyro casing 1 from the top thereof. Specifically, the displacement detecting apparatus at the S side is formed of a primary winding 4S and secondary windings 5SE and 5SW. When the gyro casing 1 deviates toward the east, the magnetic flux passing through the secondary winding 5SE is increased, while the magnetic field passing through the secondary winding 5SW is decreased so that a voltage is induced in the terminal 3-1. The phase of this voltage is selected to be the same as that of the voltage developed at the terminal 2-1 of the secondary windings 5NW and 5NE. Further, as shown in FIG. 3, the secondary windings 5SE, 5SW and 5NE, 5NW are further connected in a differential fashion so that when the gyro casing 1 is displaced in the east-and-west directions, no voltage is developed at a terminal 3-2, while when the gyro casing 1 makes an angular displacement around a vertical axis line 0 (vertical to the sheet of drawing), an output voltage having a phase inverted by 180° is generated at the terminal 3-2 in response to the rotation direction of the gyro casing 1.

This output voltage from the terminal 3-2 is supplied through a servo amplifier 30 (or may be supplied directly) to the control winding of the azimuth servo motor 19. The rotation of the azimuth servo motor 19 is transmitted through the azimuth pinion 20, the azimuth gear 21, the follow-up ring 16 and the horizontal ring 12 to the container 2, whereby this container 2 is controlled such that the angular displacement thereof around the above described vertical axis line becomes zero. In other words, in whatever direction the gyro casing 1 is displaced, the suspension wire 3 can be prevented from being twisted by this servo system. Thus, the gyro apparatus can be protected from the application of an external disturbance with respect to its vertical axis. In FIG. 3, reference numeral 3-3 designates an error correction signal generating apparatus which generates a voltage corresponding to the speed of a ship or its latitude and makes an offset to the follow-up operation of the azimuth followup system to thereby twist the suspension wire 3 and apply a torque around the vertical axis of tee gyro apparatus to thereby correct the error.

FIG. 4 shows the horizontal follow-up system, in which the windings 5NU, 5NL and 5SU and 5SL of the secondary sides 5N and 5S are connected in a differential fashion similarly as described above. Accordingly, no output voltage is generated at a terminal 4-1 of the secondary windings 5NU and 5NL when the gyro casing 1 is moved parallel to the container 2 in the up and down directions, while a voltage is generated at the terminal 4-1 relative to the angular movement around the horizontal axis. This output voltage is supplied through a servo amplifier 31 or may be supplied directly) to the control winding of the horizontal follow-up servo motor 10. The rotation of the horizontal follow-up servo motor 10 is transmitted through the horizontal pinion 11 and the horizontal gear 9 to the container 2 and thereby the container 2 is rotated. Thus, the above described angular displacement of the container 2 is made zero.

FIG. 5 schematically illustrates the inside of the container 2. In this case, the north-seeking end (A) side (existing on the gyro casing 1) extended from the spin axis of the gyro rotor GR within the gyro casing 1 is inclined upwardly by an angle $\theta$ relative to the horizontal plane H-H'. Here, $O_1$ is the center of gravity of the gyro casing 1, Q is the connection point of the suspension wire 3 and the gyro casing 1, P is the connection point of the suspension wire 3 and the container 2 and $O_2$ is the center of the container 2. Further, let it be assumed that when the spin axis of the gyro rotor GR within the gyro casing 1 is horizontal ($\theta=0$), he center of gravity $O_1$ of the gyro casing 1 will be coincident with the center of the container 2. Furthermore, A is the north-seeking end, B is a point spaced apart by 180° from 0 on the gyro casing 1 and A' and B' respectively are points on the container 2 and which correspond to the points A and B.

Since the suspension wire 3 has a flexural rigidity in practice, it will be positioned in a flexed curve as shown by a broken line in FIG. 5. Accordingly, it is appreciated that the axis direction moving amount $\xi$ ($O_2$ to $O_1$) of the gyro casing 1 relative to the container 2 will be reduced very slightly. However, in the practical design, this influence is very small so that the description will be made under the assumption that the suspension wire 3 is perfectly flexible. Since the points A' and B' on the container 2 and the points A and B on the gyro casing 1 are arranged by the action of the servo system so as to always exist on the same straight line as mentioned before, the container 2 is also inclined by the angle $\theta$ relative to the horizontal plane H-H' similarly to the gyro casing 1. Now, let it be assumed that no external acceleration be applied to the gyro apparatus. Then, since no external force is applied to the gyro casing 1 in the spin axis direction of the gyro rotor GR, the suspension wire 3 coincides with the vertical line. If the tension of the suspension wire 3 is taken as T and the residual mass of the gyro casing 1 except the bouyancy applied thereto by the damping liquid 7 is taken as mg, the tension T of the suspension wire 3 generates around the point $O_1$ a moment M expressed as $$M = Tr \sin \theta = Mg \, r \sin\theta$$

This moment M is applied to the gyro as the torque around the horizontal axis (which passes through the point $O_1$ and is perpendicular to the sheet of drawing). In the above equation, reference letter r designates a distance between the center of gravity $O_1$ of the gyro casing 1 and the connection point Q of the suspension wire 3 and the gyro casing 1 as shown in FIG. 5. In other words, according to this method, it is possible to "apply the torque proportional to the inclination of the spin axis relative to the horizontal plane to the gyro around its horizontal axis". Therefore, if the cycle or the period of the north-seeking movement of the gyro is determined in a range from several 10s of minutes to one hundred and several 10s of minutes by selecting the distance r, the residual mass mg and the angular movementum of the gyro, it becomes possible to obtain a gyro compass.

In FIG. 1, the azimuth angle is transmitted to the outside through a gear system (not shown) by the azimuth synchro transmitter 31 which meshs with the azimuth gear 21.

However, if the above mentioned prior art gyro compass is miniaturized and lowered in cost while high precision is maintained, there occur various kinds of difficulties. For example, when the gyro compass is miniaturized, the angular momentum of the gyro is reduced and this leads to the lowering of the precision of the gyro compass. If this lowered precision is compensated for by removing back lash of the gear system by using a pancake-type servo motor of a direct drive system, it becomes impossible to use the tube type synchro transmitter shown in FIG. 1 which requires the gear system. Although a synchro transmitter of a pancake-type is commercially available, these are generally very expensive. Further, when these synchro transmitters are connected to a computer, it is required to employ an expensive SD (synchro to digital) converter.

SUMMARY OF THE INVENTION

Accordingly, it is an object of this invention to provide an improved gyro apparatus.

It is another object of this invention to provide an improved gyro apparatus which can be lowered in cost and miniaturized in size considerably.

It is still another object of this invention to provide an improved gyro apparatus which can be connected to a central processing unit and so on without expensive means.

It is further object of this invention to provide an improved gyro apparatus which is very high in precision.

It is still a further object of this invention to provide an improved gyro apparatus which can considerably reduce the time necessary for setting a gyro compass.

It is yet a further object of this invention to provide an improved gyro apparatus which is very suitable for use not only with ships but also with land navigation vehicles.

Accordingly to one aspect of the present invention, there is provided a gyro apparatus comprising a binnacle, a gyro the spin axis of which is made substantially horizontal, a supporting apparatus for supporting said gyro from said binnacle with a freedom of three axes, a north-seeking apparatus for giving a north-seeking action to said gyro, a follow-up ring following up said gyro around its vertical axis, a servo motor for rotating said follow-up ring by a deviation signal generated around the vertical axis of said gyro relative to said follow-up ring and a transmitting apparatus for transmitting an azimuth angle of said spin axis relative to said binnacle to the outside, said gyro apparatus being characterized in that said transmitting apparatus is formed of a digital encoder having reference angular position transmitting means and a first counter apparatus being made operable by an output signal of said encoder.

These and other objects, features and advantages of the present invention will become apparent from the follow-up detailed description of the preferred embodiment taken in conjunction with the accompanying drawings, throughout which like reference numerals designate like elements and parts.

BRIEF DESCRIPTION OF THE DRAWINGS

FIG. 10 is a block diagram showing a signal processing section of the optical type encoder shown in FIG. 8;

DESCRIPTION OF THE PREFERRED EMBODIMENTS

Figure 1:
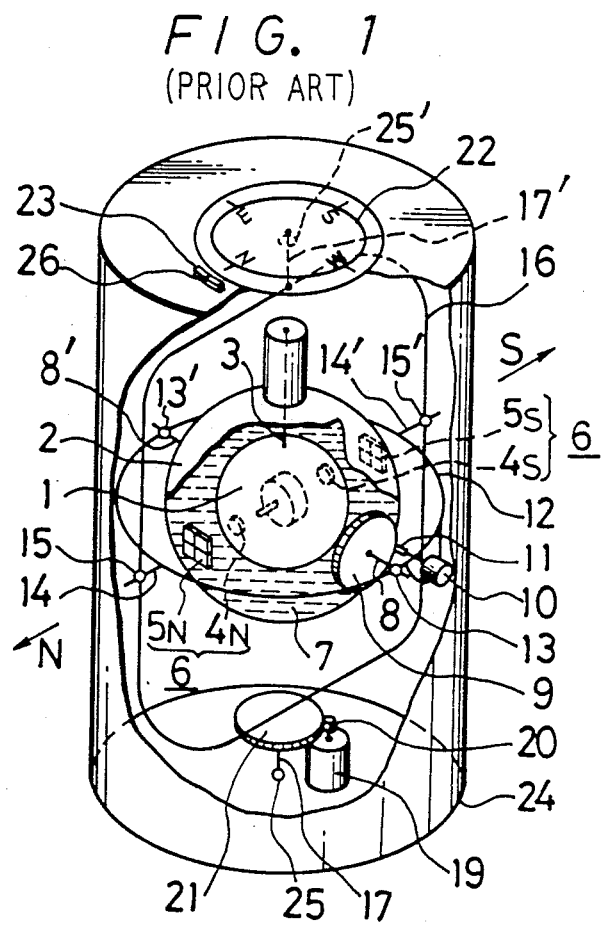
FIG. 1 is a schematic partially cut-away perspective view of an example of a gyro compass to which the present invention is applied.
Figure 2:
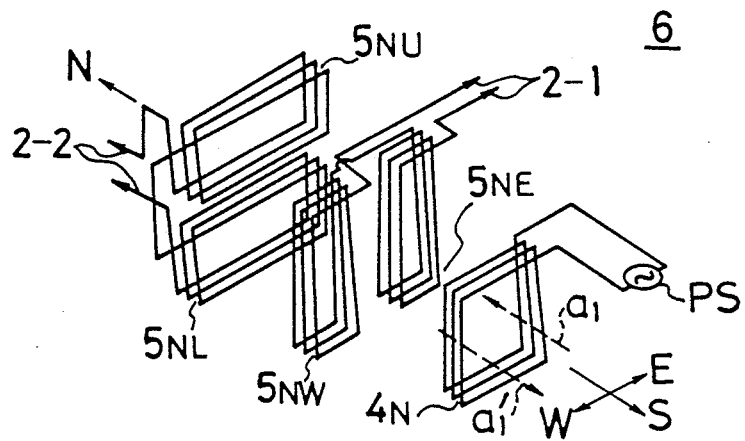
FIG. 2 is a schematic representation of a displacement detecting apparatus used in the gyro compass in FIG. 1.
Figure 6:
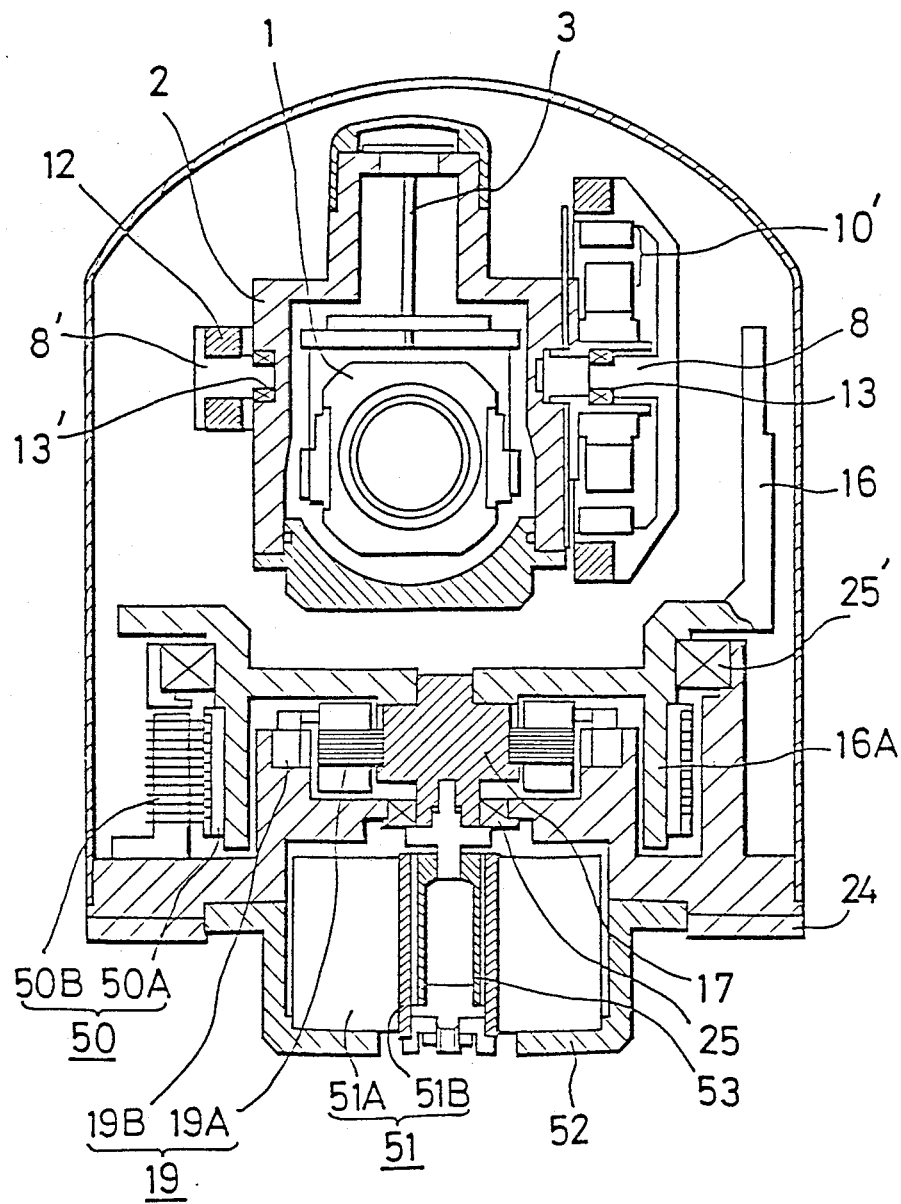
FIG. 6 is a cross-sectional view showing one embodiment of a gyro apparatus according to the present invention.
Figure 7:
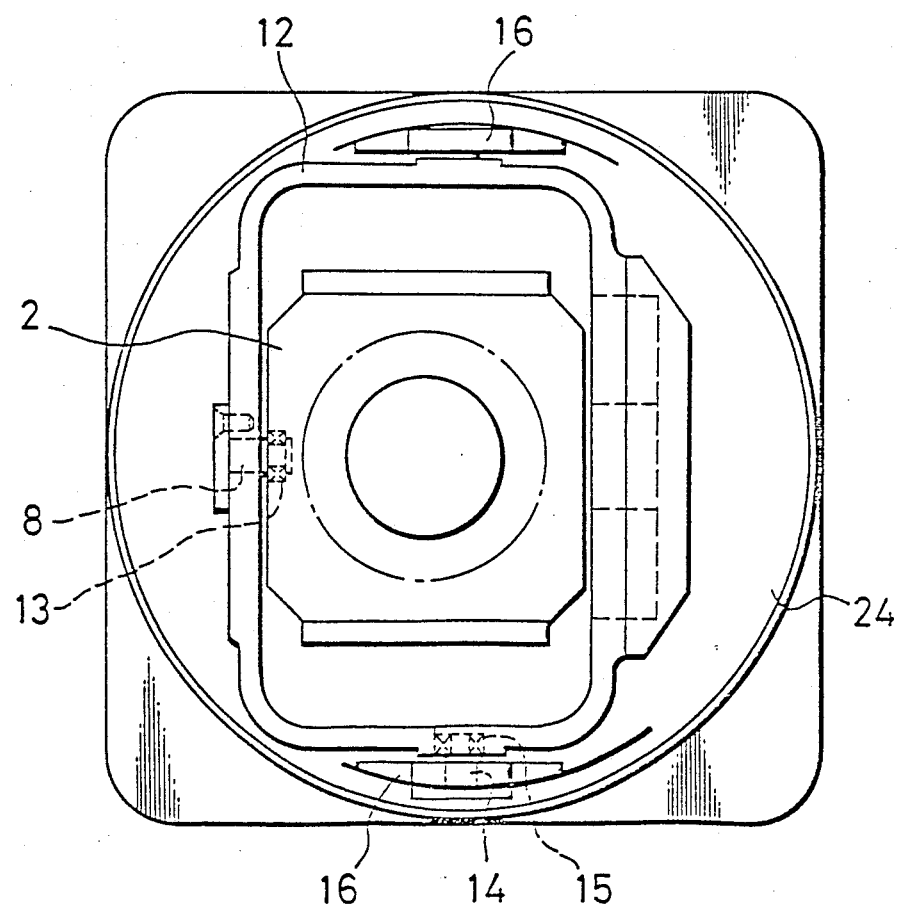
FIG. 7 is a top view thereof.

Referring now to FIGS. 6 and 7, one embodiment of the gyro apparatus according to this invention will hereinafter be described in detail. FIG. 6 is a cross-sectional view showing one embodiment of the invention and FIG. 7 is a top view thereof. In FIGS. 6 and 7, like parts corresponding to those of FIG. 1 are marked with the same references and will not be described.

In FIGS. 6 and 7, reference numeral 10' designates a pancake-type horizontal servo motor which is attached to the horizontal shaft 8 of the horizontal ring 12. Since this pancake-type horizontal servo motor 12' is of a direct drive system, the horizontal pinion 11, the horizontal gear 9 and the like used in the prior art example of FIG. 1 are not required and hence, they are removed. The follow-up ring 16 is not formed as an annular shape but as a fork-shape (one arm is not shown in FIG. 6) because of the miniaturization of the gyro apparatus. Since the follow-up shaft 17 fixed to the follow-up ring 16 is supported by a thin-type ball bearing 25' having a large diameter and a ball bearing 25 having a small diameter, the follow-up ring 16 is supported from the binnacle 24 in a canti-lever fashion. To the follow-u shaft 17, there is fixedly mounted a rotor 19A of a pancake-type azimuth servo motor 19, while there is also fixedly mounted a stator 19B of the azimuth servo motor 19 to the binnacle 24 at its corresponding position, respectively. The follow-up ring 16 is provided at the outer peripheral portion of the above mentioned servo motor 19 with a skirt portion 16A protruded in the down direction. To the outer peripheral portion of the skirt portion 16A, there is fixed a current collecting ring 50A of a slip ring 50. Further, a brush 50B is fixedly mounted on the binnacle 24 at its position corresponding to the above mentioned current collecting ring 50A. Through these ring 50A, brush 50B and the like, a current is supplied to the gyro rotor, the horizontal servo motor 10' and so on.

To the lower portion of the binnacle 24, there is attached a housing member 51A of an azimuth encoder 51 through an attaching member 52. On the other hand, to the follow-up shaft 17, there is coupled a shaft 51B of the azimuth encoder 51 through a coupling 53. Accordingly, the azimuth encoder 51 generates an azimuth angle of the follow-up ring 16 relative to the binnacle 24.

Figure 8:
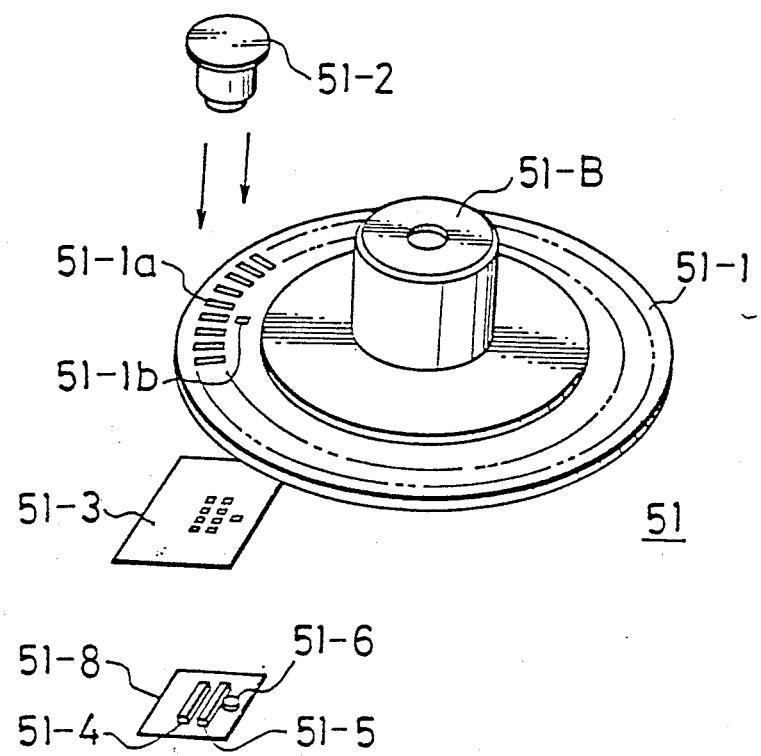
FIG. 8 is a perspective view showing one portion of an optical type encoder used in this invention.

FIG. 8 is an enlarged perspective view of main portion of the azimuth encoder 51 according to the present invention.

As seen in FIG. 8, a slit disc 51-1 includes at its central portion the boss 51B which is fixed to the follow-up shaft 17. This slit disc 51-1 is further provided with a large number of slits 51-1a which are elongated in the radial direction of the slit disc 51-1 and located on its same circumference with an equal spacing. Furthermore, the slit disc 51-1 is provided with a single reference slit 51-1b on its circumference having a radius different from and shorter than that of the slits 51-1a at a certain position of the circumference. A slit plate 51-3 is located at the opposite side of a light emission element 51-2 across the slit-disc 51-1. Further, a light receiving element base plate 51-8 having light receiving elements 51-4, 51-5 and 51-6 is located in the proximity of the slit plate 51-3 or in contact with its plane opposite to the slit disc 51-1.

Figure 9:
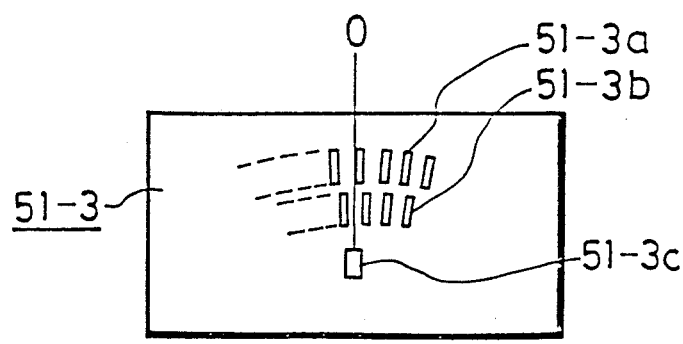
FIG. 9 is a partially enlarged view of one portion of the optical type encoder in FIG. 8.

FIG. 9 is an enlarged plan view of the slit plate 51-3. In FIG. 9, reference numerals 51-3a and 51-3b designate a large number of detection slits formed through the slit plate 51-3, respectively. The detection slits 11-3a and 51-3b are each located on the circumference corresponding to the slit 51-1a of the above mentioned slit disc 51-1, the pitch thereof is selected to be the same as that of the slit 51-1a and the length thereof in the radial direction is selected to be about half the length of each slit 51-1a. Reference numeral 51-3c designates a detection reference slit the size of which is selected to be the same as that of the reference slit 51-1b of the slit disc 51-1. This detection reference slit 51-3c is located on the same circumference as that of the reference slit 51-1b.

In the azimuth encoder 51 shown in FIG. 8, the light emitted from the light emission element 51-2 and passed through the slit 51-1a of the slit disc 51-1 and the detection slits 51-3a and 51-3b of the slit plate 51-3 reaches the light receiving elements 51-4 and 51-5 located on the light receiving element base plate 51-8. When, now, the slit disc 51-1 is rotated together with the follow-up shaft 17, if the slit 51-1a rotating and the detection slit 51-3a or 51-3b of the slit plate 51-3 standing still coincide with each other, the light from the light emission element 51-2 is passed through both the slits and reaches the light receiving element 51-4 or 51-5. Accordingly, the signal voltage can be generated from the light receiving element 51-4 or 51-5. Whereas, if the rotational position of the slit disc 51-1 is displaced by the half pitch amount of the slit 51-1a, the light from the light emission element 51-2 does not reach the light receiving element 51-4 or 51-5 so that neither of the light receiving elements 51-4 and 51-5 generate any signal voltage. In other words, the light receiving elements 51-4 and 51-5 can generate the voltage of one pulse each time the slit disc 51-1 is rotated by one pitch of the slit 51-1a thereof. Accordingly, if the number of the resulting is counted, it is possible to detect the rotation angle of the slit disc 51-1, that is, the follow-up shaft 17. On the other hand, since the detection slit 51-3b is displaced from the detection slit 51-3a by the ¼ pitch amount in the circumferential direction, the phase of the output signal of the light receiving element 51-5 which receives the light emitted from the light emission element 51-2 add passes through the slit 51-1a and the detection slit 51-3b has a phase difference of the ¼ pitch relative to the phase of the output signal from the light receiving element 51-4. Accordingly, if both the output signals are processed, it becomes possible to detect the rotation direction of the slit disc 5-11. Further, when the slit disc 51-1 reaches the reference position and hence the reference slit 51-1b and the detection reference slit 51-3c coincide with each other, the light from the light emission element 51-2 will pass through the reference slit 51-1b and the detection reference slit 51-3c and will reach the light receiving element 51-6 so that the light receiving element 51-6 generates the signal voltage.

FIG. 10 is a block diagram showing a signal processing section 55 of the azimuth encoder 51. The output signals from the light receiving elements 51-4 and 51-5 are respectively waveform-shaped so as to be rectangular waves or pulse waves by waveform shaping circuits 60 and 61 and then supplied to a rotation-direction-detecting circuit 63. In the rotation-direction-detecting circuit 63, the rotation direction of the slit disc 51-1 is detected and the resulting signal is supplied to a first counter circuit 65 which counts the number of the rectangular waves or the pulse waves to thereby calculate the rotation angle of the slit disc 51-1.

On the other hand, the signal from the light receiving element 51-6 is supplied to a waveform shaping circuit 62 in which it is waveform-shaped to a rectangular wave or a pulse wave. A reset signal generating circuit 64 receives the pulse therefrom and then supplies an angular signal corresponding to a reference angular position (for example, 0°) to the first counter circuit 65 only when the signal from the waveform shaping circuit 62 is supplied thereto, resetting the value of the first counter circuit 65 to this value. The output value of the first counter circuit 65 is supplied to an output circuit 66 and the output from the output circuit 66 is delivered to a desired apparatus or display apparatus and so on, though not shown.

Figure 3:
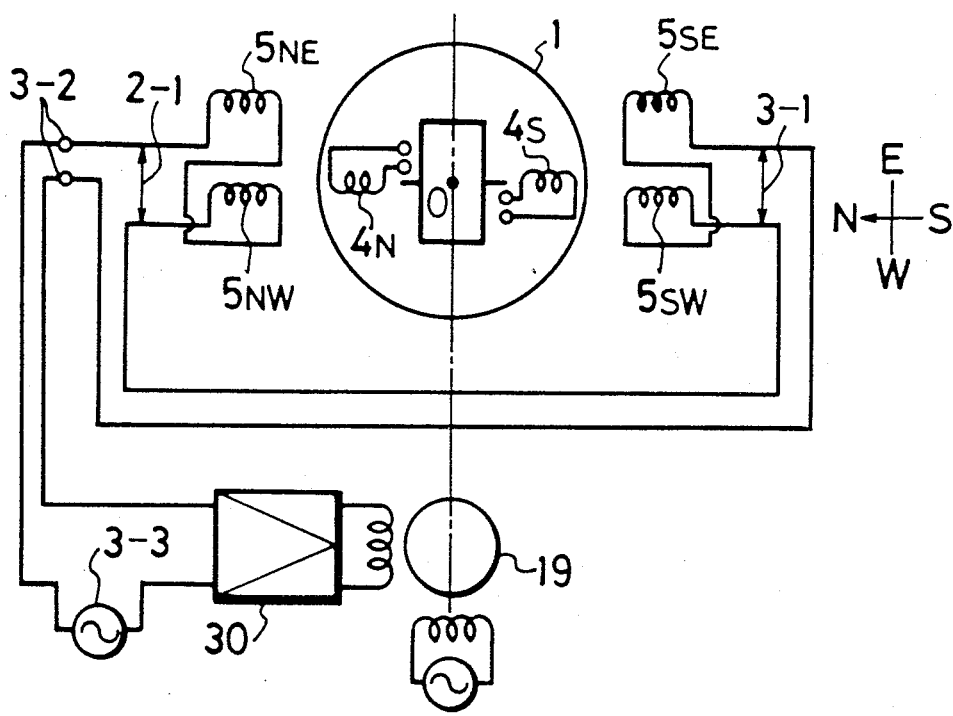
FIG. 3 is a schematic representation of an azimuth follow-up system used in the gyro compass shown in FIG. 1.
Figure 4:
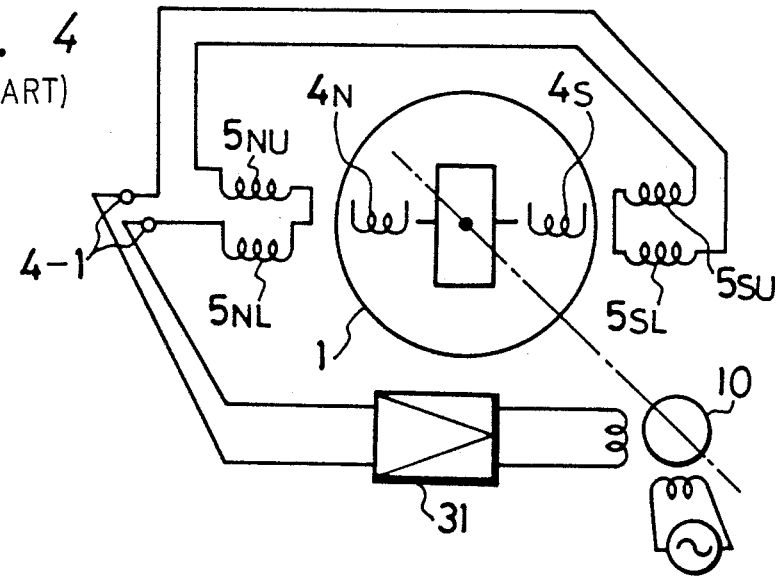
FIG. 4 is a schematic representation o a horizontal follow-up system thereof.
Figure 5:
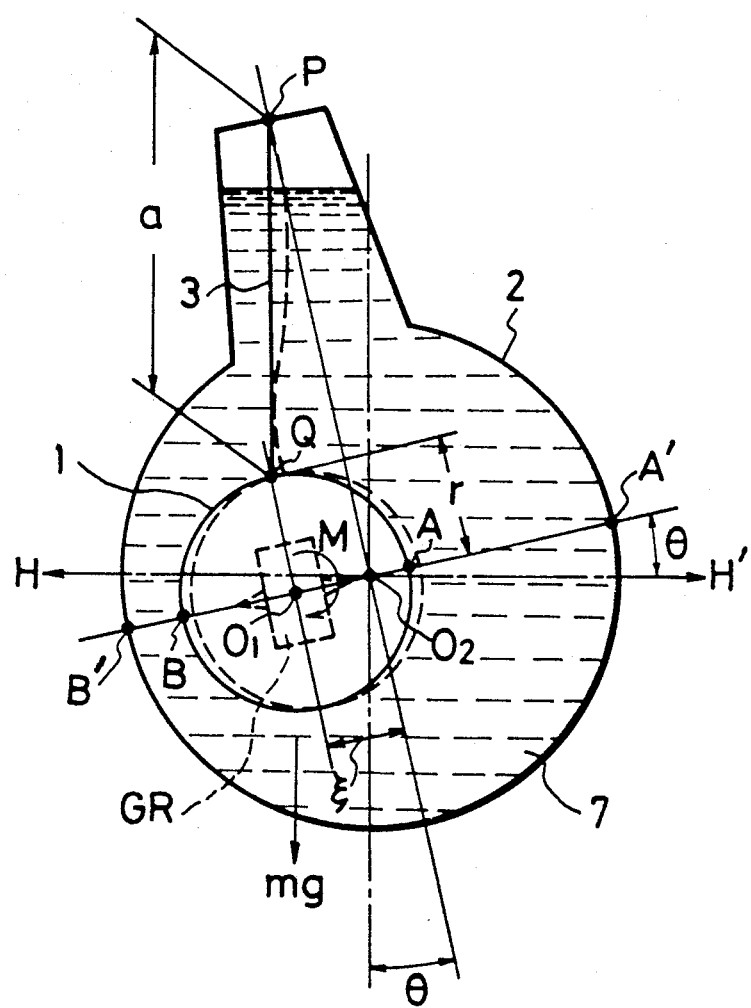
FIG. 5 is a schematic representation used to explain the north-seeking principle of the gyro compass shown in FIG. 1.
Figure 11:
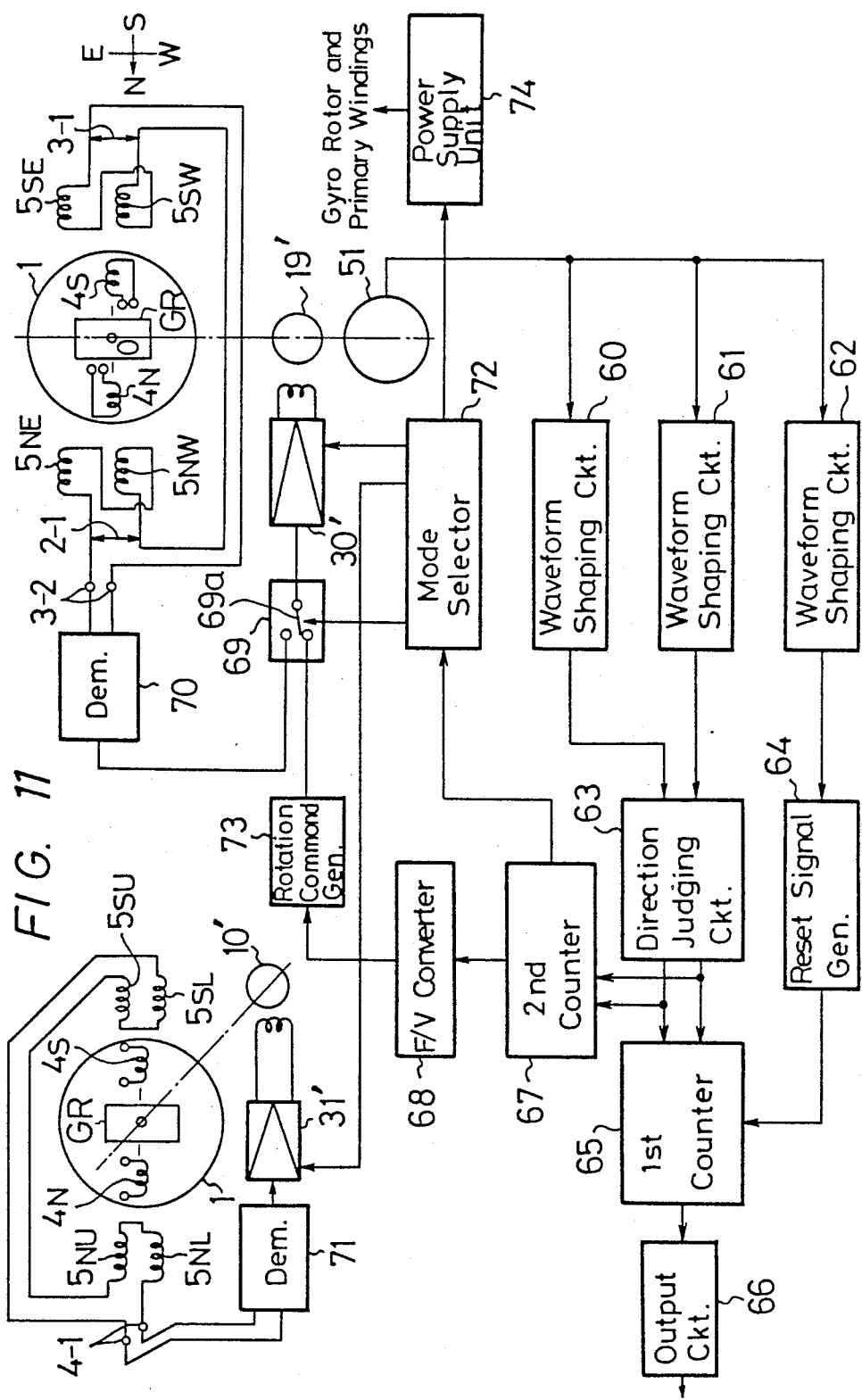
FIG. 11 is a block diagram showing an encoder resetting section used in this invention.

FIG. 11 is a block diagram showing the follow-up system (not shown in FIG. 6) of the invention which is constructed similarly to that of the azimuth follow-up system shown in FIG. 3 and to that of the follow-up system shown in FIG. 4. In FIG. 11, although the servo system is shown as a direct current servo, it is not different from that of the prior art, inherently.

Referring to FIG. 11, the differential output terminal 3-1 of secondary windings 5SE and 5SW at the S side and the differential output terminal 2-1 of secondary windings 5NE and 5NW at the N side are further connected with each other in a differential fashion. Then, an output signal at the output terminal 3-2 thereof becomes the angular displacement signal of the gyro casing 1 for the container 2 around the vertical axis of the gyro casing 1. Accordingly, if this output signal is inputted through a demodulator 70, a relay 69 and the servo amplifier 30' to an azimuth follow-up servo motor 19', the container 2 is controlled so as to always follow up the gyro casing 1 around its vertical axis. The secondary windings 5NU, 5NL and 5SU, 5SL are connected in a differential fashion similarly as described above. Then, an output signal at the output terminal 4-1 thereof becomes the angular displacement signal of the gyro casing 1 for the container 2 around the horizontal axis of the gyro casing 1. Accordingly, if this output signal is inputted through a demodulator 71 and a servo amplifier 31' to a horizontal follow-up servo motor 10', the container 2 is controlled so as to always follow up the gyro casing 1 around its horizontal axis.

Figure 12:
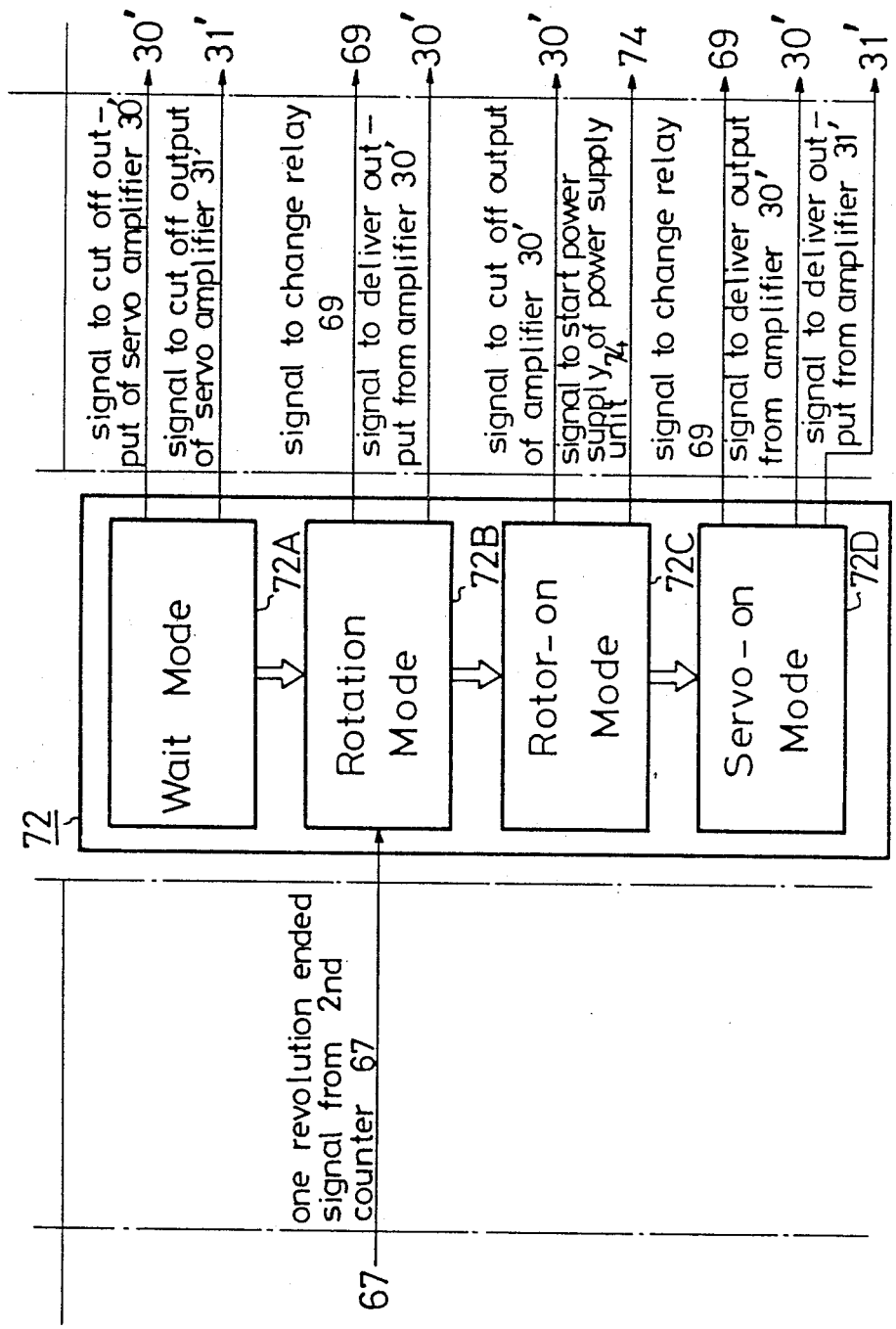
FIG. 12 is a flow-chart used to explain the operation of a mode selector.

FIG. 12 is a flow-chart showing a sequence of a mode selector 72 shown in FIG. 11. The mode selector 72 includes a wait mode 72A, a rotation mode 72B, a rotor-on mode 72C and a servo-on mode 72D. Dependent on the respective modes, the mode selector 72 delivers control signals or receiver an external signal such as the output signal from a second counter circuit 67 shown in FIG. 11.

At a time when an electric power is supplied to the gyro apparatus, the mode selector 72 is put into the wait mode 72A with a previously set time period. In this wait mode 72A, no electric power is supplied to the gyro rotor GR and the primary windings 4N and 4S shown in FIG. 11 and the servo amplifiers 30' and 31' both do not deliver output signals. The wait time period previously set in the wait mode 72A is little longer than the time period in which the gyro rotor GR coasts when the electric power is cut off (in the embodiment of this invention, the coasting time period is selected as about 100 sec.). Accordingly, when the gyro apparatus is started again after it is stopped once, the gyro rotor GR is always stopped once and then the next rotation mode 72B is presented to avoid that unnecessary force is applied to the gyro rotor GR which is rotating.

When the set wait time period of the wait mode 72A has elapsed, the wait mode 72A is ended and the next rotation mode 72B is presented. In this rotation mode 72B, the mode selector 72 switches a movable contact 69a of a relay 69 to the position shown in FIG. 11 to thereby supply an output from a rotation command generator 73 (rotation speed command signal) to the servo amplifier 30' and to control the servo amplifier 30' to thereby supply its output to the azimuth follow-up servo motor 19'. When the rotation mode 22B starts, the follow-up ring 16 (see FIG. 6) begins to rotate. This rotation of the follow-up ring 16 is detected by the azimuth encoder 51. The signal representing the rotation of the follow-up ring 16 and delivered from azimuth encoder 51 is supplied through the waveform shaping circuits 60 and 61 to the direction judging circuit 63 which then generates a pulse signal showing the rotation direction of the follow-up ring 16. This pulse signal is fed to a second counter circuit 67 the output from which is supplied as a speed pulse signal to an F/V (frequency to voltage) converter 68 which then produces a voltage corresponding to the rotation speed of the follow-up ring 16. This voltage is applied to the rotation command generator 73. This rotation command generator 73 compares the applied voltage with a voltage, which is previously set to correspond with a desired rotation speed, and then generates a command voltage necessary to rotate the follow-up ring 16 at a constant desired speed. As set forth previously, the command voltage is applied through the relay 69 to the servo amplifier 30' and amplified by the same. This amplified command voltage is applied to the azimuth follow-up servo motor 19'.

In the second counter circuit 67, there is previously set a total number of pulses when the encoder 51 or its slit disc 51-1 is rotated by one revolution (in the embodiment of the present invention, when an encoder having the resolution of 0.1 degree is employed, the total number of pulses is 3600). An up/down counter provided in the second counter circuit 67 counts the number of pulses from the encoder 51 in accordance with the rotation of the follow-up ring 16. When the counted value thereof becomes coincident with the previously set value (in this embodiment, 3600), the second counter circuit 67 supplies one revolution ended signal to the mode selector 72. When the mode selector 72 receives this one revolution ended signal, it is immediately put into the rotor-on mode 72C. During the rotation of the follow-up ring 16 in the rotation mode 72B, the encoder 51 produces a reference signal which is supplied through the waveform shaping circuit 62 and the reset signal generator 64 to the first counter circuit 65 to thereby set a reference angle therein.

When the mode selector 72 is put into the rotor-on mode 72C, it supplies an output cut-off signal to the servo amplifier 30' to thereby stop the rotation of the follow-up ring 16 and then delivers a power supply start command signal to a lower supply unit 74. When this power supply unit 74 receives the power supply start command signal, it immediately starts the supply of electric power to the gyro rotor GR and the primary windings 4N and 4S. After the start of the power supply, when the rotation speed of the gyro rotor GR arrives at a sufficient high speed or about 30 seconds have elapsed in this embodiment of the present invention, the mode selector 72 is put into the next servo-on mode 72D.

In the servo-on mode 72D, the mode selector 72 supplies a switching signal to the relay 69 which is then switched to the position opposite to that shown in FIG. 11. Thus, the output signal from the demodulator 70 is supplied to the servo amplifier 30'. At the same time, the mode selector 72 controls the servo amplifiers 30' and 31' such that the output signals therefrom are respectively supplied to the servo motors 19' and 10'. Thus, the gyro apparatus starts its north-seeking operation.

By such a process, the gyro apparatus (for example, gyro compass) of the present invention can be settled in a short time of period upon general use.

In general, when a vehicle equipped with a gyro compass is ended in its use and is stopped in its movement, operation and so on, the gyro compass points to the north. Accordingly, under such state when the electric power supply to the gyro compass is cut off, the north seeking end of the azimuth follow-up ring is maintained in pointing to the north. Therefore, upon actuating the gyro compass again, if the position of the vehicle is same as that when it is stopped before, the north seeking end of the follow-up ring still points to the north. According to the present invention, upon starting the gyro compass again, since the follow-up ring 16 can be rotated by one revolution accurately so as to reset the first counter circuit 65, while the north seeking end of the follow-up ring 16 points to the north, the first counter circuit 65 can be reset. If on the contrary the first counter circuit 65 is merely reset, it is of no need to use one revolution ended signal and it is enough that when the reset signal is delivered from the reset signal generator 64, the mode selector 72 finishes its rotation mode 72B and starts the next rotor-on mode 72C. However, according to such treatment, the north seeking end of the follow-up ring 16 will deviate from the north in general and point to the south in extreme case. When the north seeking end of the follow-up ring 16 is deviated from the north, it takes a long period of time that the gyro compass is settled as compared with the present invention.

As described above, according to the present invention, although the inexpensive incremental-type encoder which requires the reset operation is used, the gyro compass can be started while the north seeking end of its azimuth follow-up ring points to the north and the time period in which the gyro compass is settled can be shortened very much.

The up/down counter of the first counter circuit 65, which was resent by the reference signal or the reset signal from the reset signal generator 64, converts the pulse signal in response to the rotation direction of the follow-up ring 16 and delivered from the direction judging circuit 63 into a digital angular signal which is delivered through the output circuit 66 as an azimuth signal.

According to the gyro apparatus of the invention, since the inexpensive incremental-type encoder is used as the azimuth angle transmitter of the gyro compass, the gyro apparatus of the invention is lowered in cost as a compass system. Also, the transmitted azimuth angle can be supplied digitally to a CPU (central processing unit) and so on without an expensive A/D converter.

Further, according to the gyro apparats of the invention, since there is added a sequence in which before the actuation of the gyro system, the follow-up ring is rotated more than one revolution by the azimuth servo motor, the resetting of the encoder can be automated.

Furthermore, according to the gyro apparatus of the invention, since the revolution of the follow-up ring is determined correctly as one revolution (360°) before the gyro system is actuated, it is possible to reduce a time required to settle the gyro to the north.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. In a gyro apparatus comprising, a binnacle, a gyro with a spin axis which is substantially horizontal, a supporting apparatus for supporting said gyro from said binnacle with three axis freedom, a north-seeking apparatus for providing a northseeking action to said gyro, a follow-up ring which follows-up said gyro around its vertical axis, an azimuth servo motor for rotating said follow-up ring with a deviation signal generated around the vertical axis of said gyro relative to said follow-up ring through a servo amplifier, and a transmitting apparatus for transmitting the azimuth angle of said spin axis relative to said binnacle to the outside of said gyro, said gyro apparatus being characterized in that said transmitting apparatus comprises an incremental-type encoder having a reference angular position transmitting means, a first counter apparatus which is made operable by an output signal of said incremental-type encoder a second counter apparatus whose reference value is preset to the total number of pulses per one revolution of said follow-up ring supplied from said incremental-type encoder, a mode selector, a rotation command generator, and a relay apparatus connected to said rotation command generator and to receive the deviation signal around the vertical axis, said rotation command generator being connected to said second counter apparatus to generate a voltage necessary to rotate said follow-up ring at a desired rotation speed, said mode selector being connected to said second counter apparatus to produce a switching signal which is supplied to said relay apparatus, whereby before starting the gyro apparatus, said follow-up ring is rotated one revolution by the voltage from said rotation command generator to reset said first counter apparatus to a reference value.

2. A gyro apparatus as claimed in claim 1, wherein when said follow-up ring is rotated one revolution, said mode selector switches said relay apparatus and controls said servo amplifier to thereby rotate said azimuth servo motor by the deviation signal.

3. A gyro apparatus according to claim 1 further comprising a power supply unit which is controlled by said mode selector to start the power supply to said gyro when said follow-up ring is rotated one revolution.

* * * * *